(12) United States Patent  
Sano et al.

(10) Patent No.: US 9,082,026 B2  
(45) Date of Patent: Jul. 14, 2015

(54) WIRELESS TAG COMMUNICATION DEVICE, INFORMATION PROCESSING APPARATUS, AND RECORDING MEDIUM

(71) Applicant: TOSHIBA TEC KABUSHIKI KAISHA, Tokyo (JP)

(72) Inventors: Kouichi Sano, Shizuoka (JP); Jun Yaginuma, Shizuoka (JP); Sunao Tsuchida, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/649,162

(22) Filed: Oct. 11, 2012

(65) Prior Publication Data

US 2013/0093569 A1     Apr. 18, 2013

(30) Foreign Application Priority Data

Oct. 17, 2011   (JP) .................... 2011-228026

(51) Int. Cl.
| | |
|---|---|
| H04Q 1/00 | (2006.01) |
| H04Q 1/30 | (2006.01) |
| G06K 7/10 | (2006.01) |
| H04W 52/28 | (2009.01) |
| H04W 52/22 | (2009.01) |
| H04W 52/50 | (2009.01) |

(52) U.S. Cl.
CPC ......... *G06K 7/10207* (2013.01); *H04W 52/287* (2013.01); *H04W 52/228* (2013.01); *H04W 52/50* (2013.01); *Y02B 60/50* (2013.01)

(58) Field of Classification Search
CPC ....................................................... H04Q 1/00
USPC ......... 340/10.1–10.5, 572.4, 7.21, 7.24, 7.32; 455/226.1, 420; 236/46; 342/42; 343/745, 702

See application file for complete search history.

(56) References Cited

U.S. PATENT DOCUMENTS

| | | | | |
|---|---|---|---|---|
| 6,104,512 A | * | 8/2000 | Batey et al. ................... | 398/120 |
| 6,486,769 B1 | * | 11/2002 | McLean ..................... | 340/10.32 |
| 6,501,959 B1 | * | 12/2002 | Seon ............................. | 455/522 |

(Continued)

FOREIGN PATENT DOCUMENTS

| | | |
|---|---|---|
| JP | 2005-159653 | 6/2005 |
| JP | 2009-098951 | 5/2009 |

(Continued)

OTHER PUBLICATIONS

Office Action of Notification of Reason(s) for Refusal for Japanese Patent Application No. 2014-043914 Dated Jan. 20, 2015, 8 pages.

*Primary Examiner* — Nam V Nguyen

(74) *Attorney, Agent, or Firm* — Amin, Turocy & Watson, LLP

(57) ABSTRACT

According to one embodiment, a wireless tag communication device detects a communication state between an antenna and a specific wireless tag to be searched, stores a transmission power value obtained if the communication state is better than a predetermined value, reduces transmission power to the wireless tag and, if the communication state is worse than the predetermined value, increases, on the basis of the stored transmission power value, the transmission power to be higher than the transmission power value and performs communication with the wireless tag, and performs resetting on the basis of the stored transmission power value if the communication state further worsens.

10 Claims, 11 Drawing Sheets

(56) References Cited

U.S. PATENT DOCUMENTS

| | | | |
|---|---|---|---|
| 7,072,582 B2 * | 7/2006 | Stevens | 398/38 |
| 7,132,989 B1 * | 11/2006 | Poilasne | 343/745 |
| 7,167,079 B2 * | 1/2007 | Smyth et al. | 340/7.21 |
| 7,592,961 B2 * | 9/2009 | Thober et al. | 343/745 |
| 8,120,486 B2 * | 2/2012 | Rinkes | 340/572.1 |
| 2010/0141450 A1 | 6/2010 | Nagai | |
| 2011/0199193 A1 | 8/2011 | Sano | |

FOREIGN PATENT DOCUMENTS

| | | |
|---|---|---|
| JP | 2011-185825 | 9/2011 |
| JP | 2011-237941 | 11/2011 |
| WO | 2009-034806 | 3/2009 |

\* cited by examiner

FIG.8
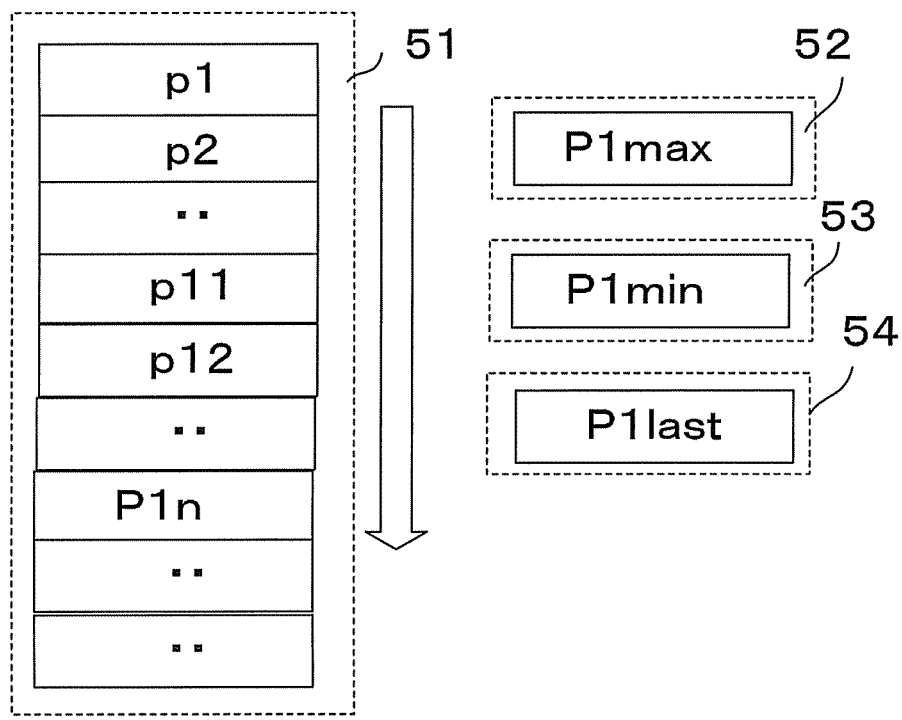
FIG.10A  FIG.10B
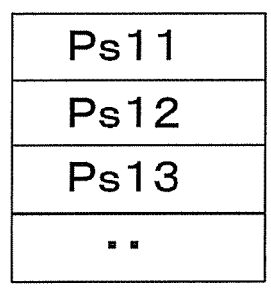 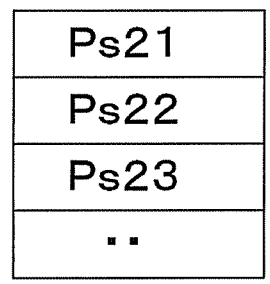
FIG.10C  FIG.10D
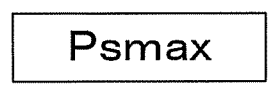 

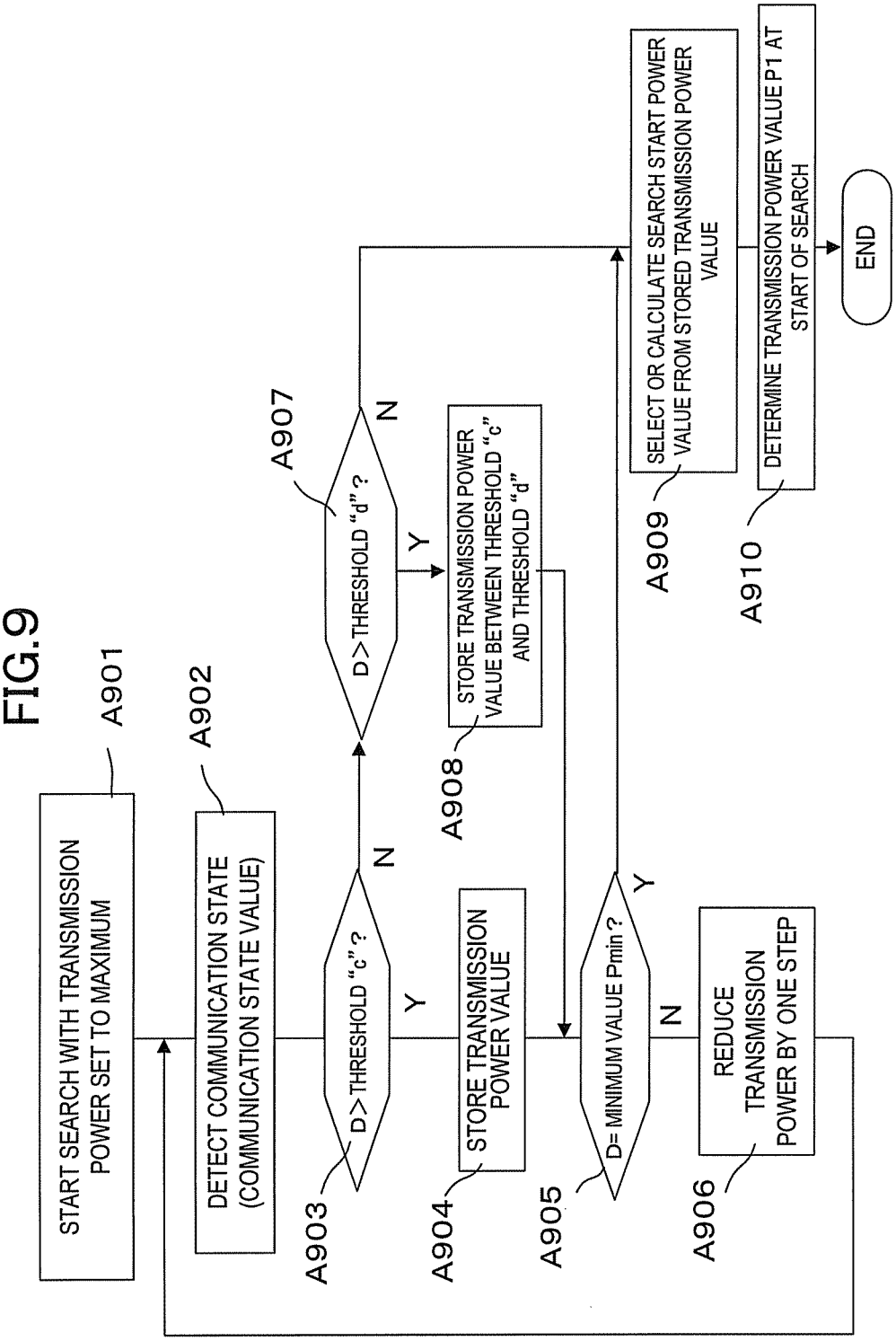

WIRELESS TAG COMMUNICATION DEVICE, INFORMATION PROCESSING APPARATUS, AND RECORDING MEDIUM

CROSS-REFERENCE TO RELATED APPLICATION

This application is based upon and claims the benefit of priority from the Japanese Patent Application No. 2011-228026, filed on Oct. 17, 2011; the entire contents of which are incorporated herein by reference.

FIELD

Embodiments described herein relate generally to a wireless tag communication device that communicates with a wireless tag (also referred to as RFID (Radio Frequency Identification) tag) in a noncontact manner, an information processing apparatus, and a recording medium.

BACKGROUND

In recent years, a wireless tag system attracts attention and more and more companies introduce the wireless tag system. In the wireless tag system, a wireless tag including, an IC chip and an antenna is attached to an article and ID information stored in a memory in the IC chip is read by a wireless tag communication device in a noncontact manner.

As work performed using the wireless tag system, there is work for searching for a specific wireless tag using the wireless tag communication device in an area where a large number of articles respectively attached with wireless tags are present.

In the beginning, the wireless tag communication device transmits a query radio wave from a transmitting section in a relatively large communication area. The wireless tag communication device reads, in a receiving section, all wireless tags present in a communication area according to response signals from the wireless tags. An interrogator is known that controls, if a plurality of wireless tags are present, a transmission power adjusting circuit to automatically reduce the communication area and repeats reading work. It is also disclosed that an effect same as an effect obtained by reducing transmission power can be obtained by reducing reception sensitivity.

However, in such an interrogator, the transmission power is reduced until only one RF tag is left in the communication area. If a user changes the direction of the interrogator or moves the interrogator in a direction different from the location of a search target RF tag because of some cause, the interrogator may be unable to read the search target RF tag and may lose track of the search target RF tag.

The communication area is different depending on a type of an RF tag in use, a material of an article attached with the RF tag, a method of attaching the RF tag, and the like. If transmission power in an initial state is extremely large with respect to the distance between the initial location of the user and the location of the search target and the communication area is too large, a large number of non-search target RF tags are read and an amount of change of the transmission power reduced until only one RF tag is left in the communication area is large. Therefore, the search is inefficient and a long time is required for the search.

BRIEF DESCRIPTION OF THE DRAWINGS

FIG. 8 is a diagram for explaining power values stored in the transmission-power storing section shown in FIG. 5;

FIG. 9 is a flowchart for explaining an operation for determining an initial value of transmission power at the start of a search for a wireless tag;

FIG. 10A is a diagram of an example of time series stored in the transmission-power storing section when a transmission power value determined as an initial value is selected or calculated in FIG. 9;

FIG. 10B is a diagram of another example of the time series stored in the transmission-power storing section when the transmission power value determined as the initial value is selected or calculated;

FIG. 10C is a diagram of an example of a maximum value stored in the transmission-power storing section when the transmission power value determined as the initial value is selected or calculated;

FIG. 10D is a diagram of an example of a minimum value stored in the transmission-power storing section when the transmission power value determined as the initial value is selected or calculated;

DETAILED DESCRIPTION

There are provided a wireless tag communication device, an information processing apparatus, and a recording medium that can easily, quickly, and efficiently make recovery even if losing track of a search target wireless tag.

In general according to one embodiment, a wireless tag communication device includes: a transmission-power control section configured to control transmission power of transmission from an antenna to a specific wireless tag to be searched; a communication-state detecting section configured to detect a communication state between the antenna and the wireless tag; a transmission-power storing section configured to store a transmission power value obtained if the communication state detected by the communication-state detecting section is better than a predetermined value; a transmission-power control section configured to reduce transmission power to the wireless tag using the transmission-power control section and, if the communication-state detecting section detects that the communication state is worse than the predetermined value, increase, on the basis of the transmission power value stored in the transmission-power storing section, the transmission power to be higher than the transmission power value and perform communication with the wireless tag; and a resetting section configured to perform resetting on the basis of the stored transmission power value if the communication-state detecting section detects that the communication state further worsens.

Figure 1:
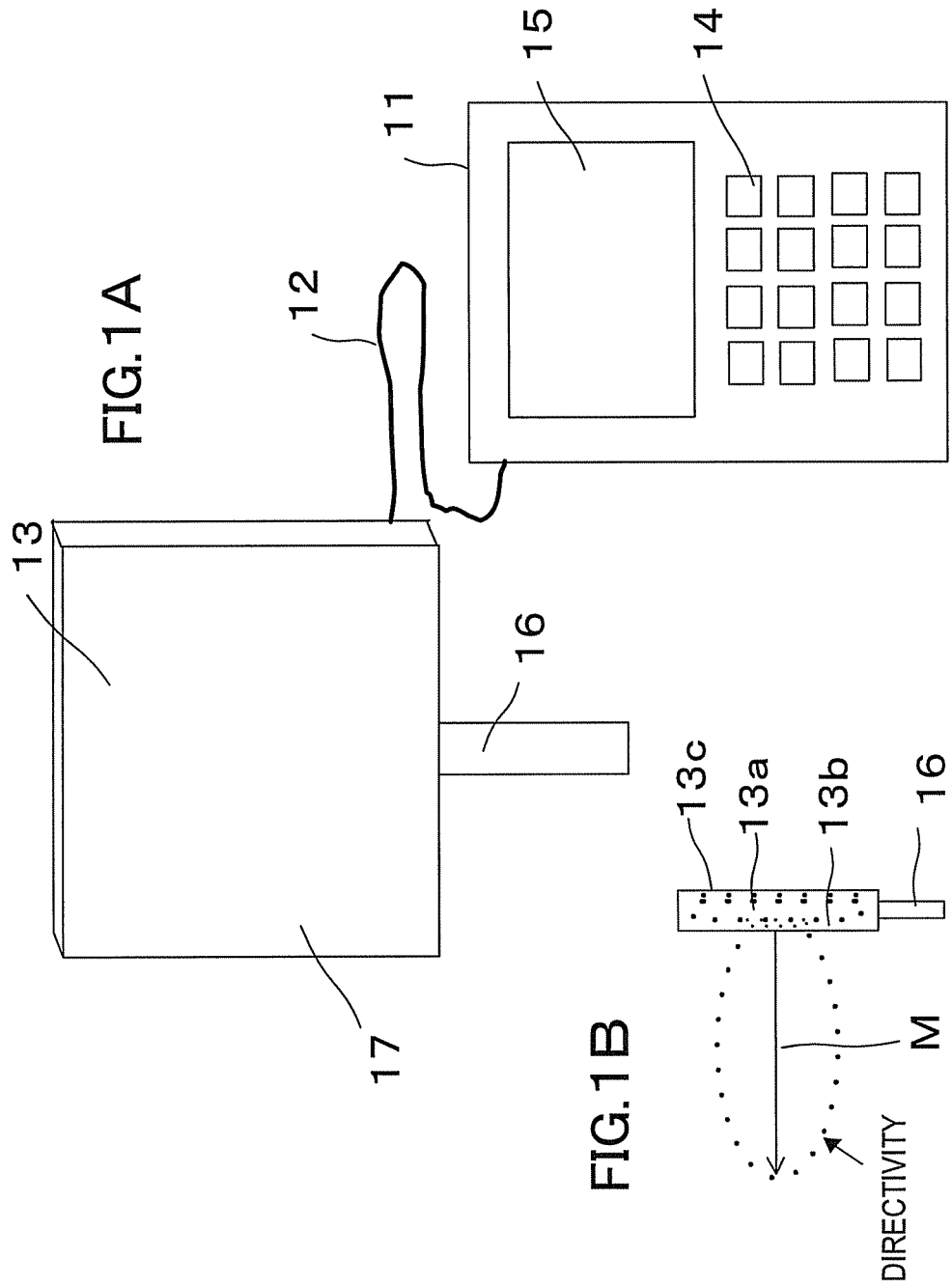
FIG. 1A is an overall view of a wireless tag communication device according to an embodiment.
FIG. 1B is a sectional view of an antenna in the embodiment.

A wireless tag communication device according to an embodiment is explained below with reference to the accompanying drawings. The entire wireless tag communication device is shown in FIG. 1A. A portable wireless tag communication device is explained as an example.

The wireless tag communication device includes a main body 11 and an antenna 13 connected to the main body 11 by an antenna cable 12.

The main body 11 includes input keys 14 for a user to input data and a display section 15 that displays a job to be executed, a state or a communication result of the wireless tag communication device, and the like. The antenna 13 includes a grip 16 for the user to hold the antenna 13 and a housing 17. Although not shown in the figure, the antenna 13 and the main body 11 may be able to be coupled and integrated.

As shown in FIG. 1B as an example, the antenna 13 is a plane patch antenna in which a radiator 13b is formed on one surface of a tabular dielectric 13a and a ground plate (GND) 13c is formed on the other surface. The antenna 13 has directivity having a maximum gain M in a substantially perpendicular direction with respect to the center of one surface of the antenna 13. The wireless tag communication device performs communication while specifying in advance one of a plurality of wireless tags present in an area.

Figure 2:
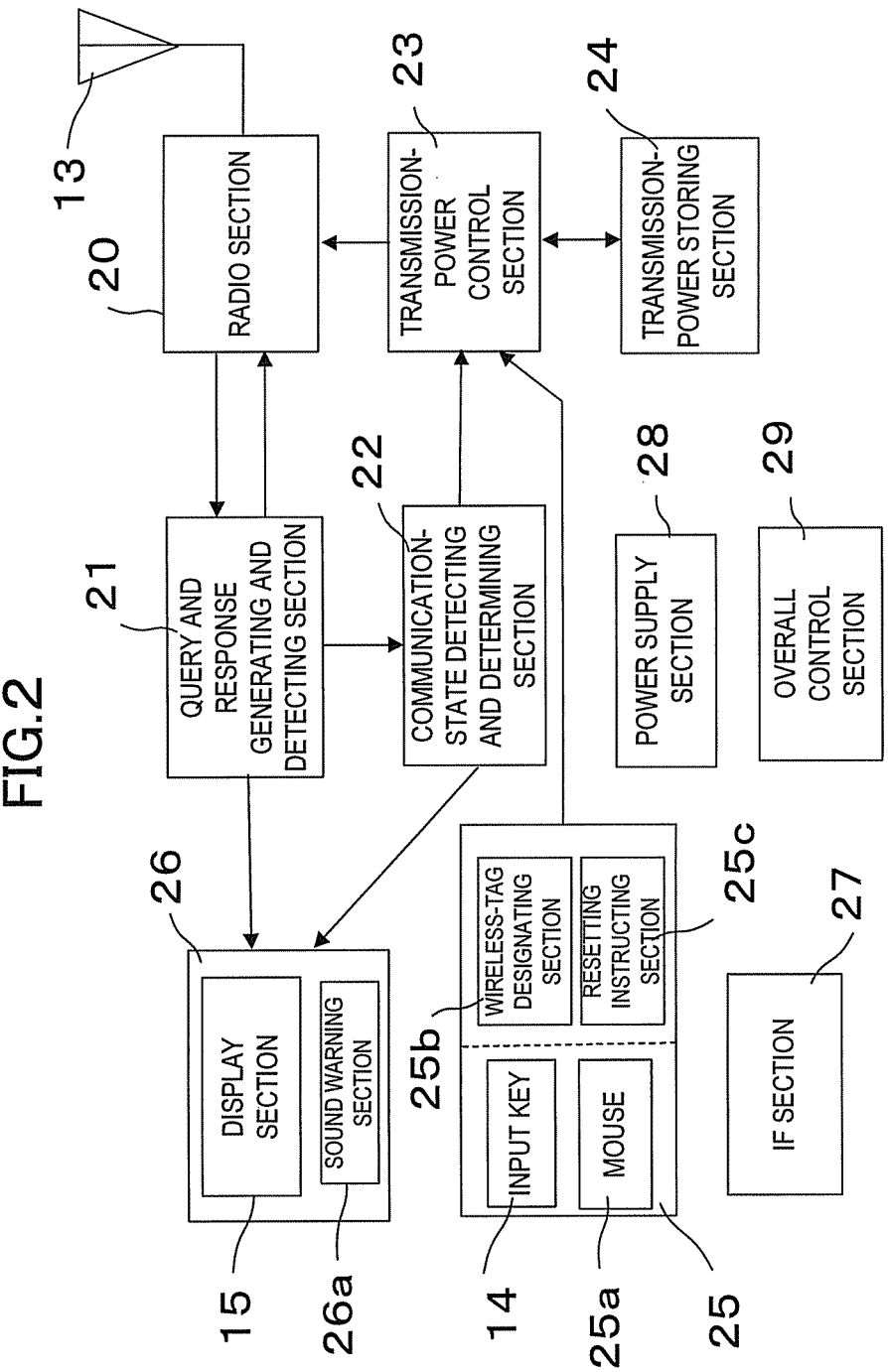
FIG. 2 is a diagram of an overall electric configuration of the wireless tag communication device.

A schematic block diagram of an electric configuration of the wireless tag communication device according to this embodiment is shown in FIG. 2. A query signal subjected to amplitude modulation is transmitted to a wireless tag specified in advance. A response signal transmitted from the wireless tag is subjected to quadrature demodulation.

The wireless tag communication device includes a radio section 20 that performs communication with a wireless tag via the antenna 13, a query and response generating and detecting section 21 that generates a query signal to be transmitted from the antenna 13 and detects and decodes content of a response signal received from the wireless tag, a communication-state detecting and determining section 22 that detects and determines a communication state between the antenna 13 and the wireless tag, a transmission-power control section 23 that controls transmission power of transmission from the antenna 13 on the basis of a result of the determination, a transmission-power storing section 24 that stores the transmission power controlled by the transmission-power control section 23, an input section 25 that receives input of resetting from the outside, for example, if a wireless tag to communicate with may be unable to be specified or communication with a specified wireless tag may be unable to be performed, a notifying section 26 that notifies a user of a communication state and the like of the device, an interface (IF) section 27 that performs communication with a host computer and the like, a power supply section 28 that supplies electric power to the sections, and an overall control section 29 that controls the sections as a whole.

The transmission-power storing section 24 is configured by a storage circuit. As explained below, transmission power controlled by the transmission-power control section 23 is stored in time series in the transmission-power storing section 24. A maximum value, a minimum value, a newest value (a latest value), and the like of transmission power in a satisfactory communication state are also stored in the transmission-power storing section 24.

As shown in FIG. 2, the input section 25 includes the input keys 14 and a mouse 25a. The notifying section 26 includes the display section 15 and a sound warning section 26a including a buzzer that emits, for example, a warning by sound to a user if the wireless tag communication device changes to a predetermined state. The input section 25 further includes a wireless-tag designating section 25b for designating a wireless tag with which the wireless tag communication device performs communication and a resetting instructing section 25c that performs resetting when the wireless tag communication device loses track of a wireless tag being tracked. The user performs input using the input keys 14 or the mouse 25a, whereby designation and resetting of a wireless tag are performed. The power supply section 28 includes a battery and a control circuit that controls charging and discharging of the battery.

In FIG. 2, electric power is supplied from the power supply section 28 to the sections. The overall control section 29 controls the sections. However, arrows indicating the power supply and the control are not shown to make it easy to see the figure.

Figure 3:
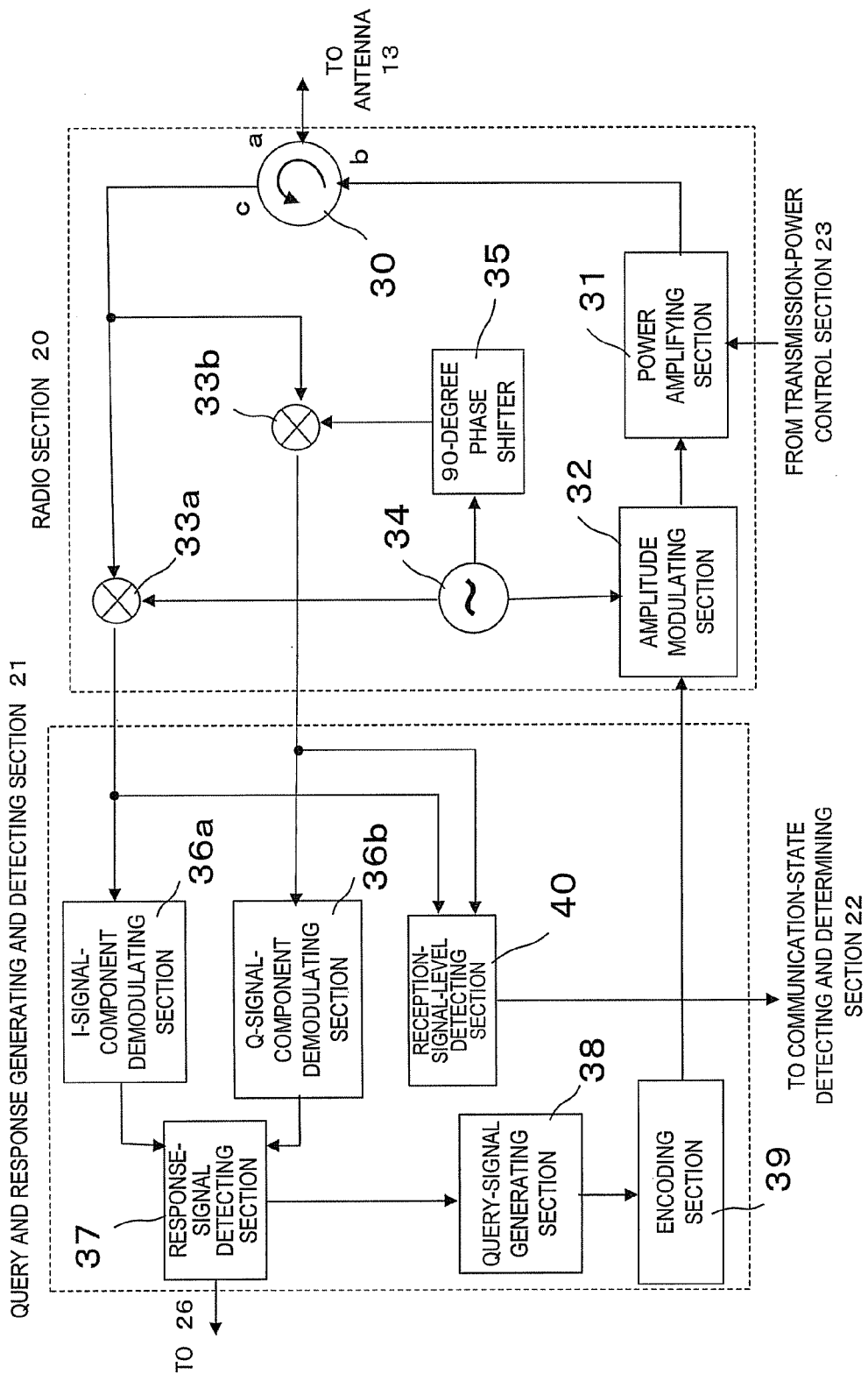
FIG. 3 is a diagram of a configuration example of a query and response generating and detecting section and a radio section in FIG. 2.

A configuration example of the radio section 20 and the query and response generating and detecting section 21 is shown in FIG. 3. The radio section 20 includes a directional coupler, for example, a circulator 30, a first terminal "a" of which is connected to the antenna 13, a power amplifying section 31, an output terminal of which is connected to a second terminal "b" of the circulator 30, an amplitude modulating section 32, an output terminal of which is connected to an input terminal of the power amplifying section 31, multipliers 33a and 33b, input terminals of which are connected to a third terminal "c" of the circulator 30, a local oscillator 34 that supplies an oscillation output to the multiplier 33a and the amplitude modulating section 32, and a 90-degree phase shifter 35 that phase-shifts an output of the local oscillator 34 by 90° and supplies a phase-shift output to the multiplier 33b.

The circulator 30 has directionality of a signal in the order of the second terminal "b", the first terminal "a", and the third terminal "c". An output of the power amplifying section 31 supplied to the second terminal "b" is supplied from the first terminal "a" to the antenna 13. A reception signal from the antenna 13 input to the first terminal "a" is supplied from the third terminal "c" to the multipliers 33a and 33b.

An output of the transmission-power control section 23 is supplied to the power amplifying section 31 as a control signal. The power amplifying section 31 controls to increase or reduce an amplification degree of a power amplifier to thereby change the magnitude of electric power transmitted from the antenna 13. A communication protocol function of an RFID tag conforming to, for example, ISO18000-6 type C is installed in the overall control section 29 or the transmission-power control section 23. Transmission power can be appropriately set according to a transmission power setting signal from the transmission-power control section 23.

If a wireless tag is a passive tag not including a battery, first, an unmodulated wave is amplified by the power amplifying section 31 to output an electromagnetic wave from the antenna 13 via the circulator 30 to activate the wireless tag.

When data is transmitted to the wireless tag, a signal encoded by an encoding section 39 is subjected to amplitude modulation according to an output of the local oscillator 34. When a signal is received from the wireless tag, in a state in which an unmodulated carrier wave is transmitted from the wireless tag communication device, the wireless tag controls (back-scatters) the impedance of an antenna, whereby a reflection state changes. The change in the reflection state is detected by the antenna 13 of the wireless tag communication device. A received electromagnetic wave signal is subjected to quadrature demodulation via the circulator 30. For example, a synchronization clock is generated, a predetermined preamble is detected, the head of the data is detected, and the data is decoded to obtain reception data. Presence or absence of an error can also be detected using an error detection code. In the configuration shown in FIG. 3, unless there is an error in demodulation in either one of demodulation in an in-phase component and demodulation in a quadrature component of the quadrature demodulation, it is regarded that the data is correctly received.

The query and response generating and detecting section 21 includes an I-signal-component demodulating section 36a that demodulates an I signal component using a multiplication output of the multiplier 33a as an input signal, a Q-signal-component demodulating section 36b that demodulates a Q signal component using a multiplication output of the multiplier 33b as an input signal, a response-signal detecting section 37 that detects, from signals demodulated by the demodulating sections, a response signal transmitted from a wireless tag, a query-signal generating section 38 that generates a query signal to be transmitted to the wireless tag, an encoding section 39 that encodes the query signal generated by the query-signal generating section 38 and sends the encoded query signal to the amplitude modulating section 32, and a reception-signal-level detecting section 40 that detects a level of a reception signal from the I signal component and the Q signal component input to the I-signal-component demodulating section 36a and the Q-signal-component demodulating section 36b.

The reception-signal-level detecting section 40 detects and outputs larger amplitude of the amplitudes of the I signal and the Q signal. Alternatively, since the I signal and the Q signal are orthogonal to each other, the reception-signal-level detecting section 40 may detect and output vector-synthesized amplitude ($=\sqrt{(I^2+Q^2)}$, I and Q respectively indicate the amplitude of the I signal and the amplitude of the Q signal).

The output of the reception-signal-level detecting section 40 is supplied to the communication-state detecting and determining section 22. The output of the encoding section 39, i.e., the encoded query signal is input to the amplitude modulating section 32. The query signal amplitude-modulated by an oscillation signal input from the local oscillator 34 as a modulation signal is power-amplified by the power amplifying section 31, sent from the circulator 30 to the antenna 13, and transmitted to the wireless tag.

The response signal obtained by the response-signal detecting section 37 is sent to the notifying section 26 and displayed on the display section 15. If a predetermined condition set in advance is satisfied, the sound warning section 26a emits a warning to the user by sound or voice.

Figure 4:
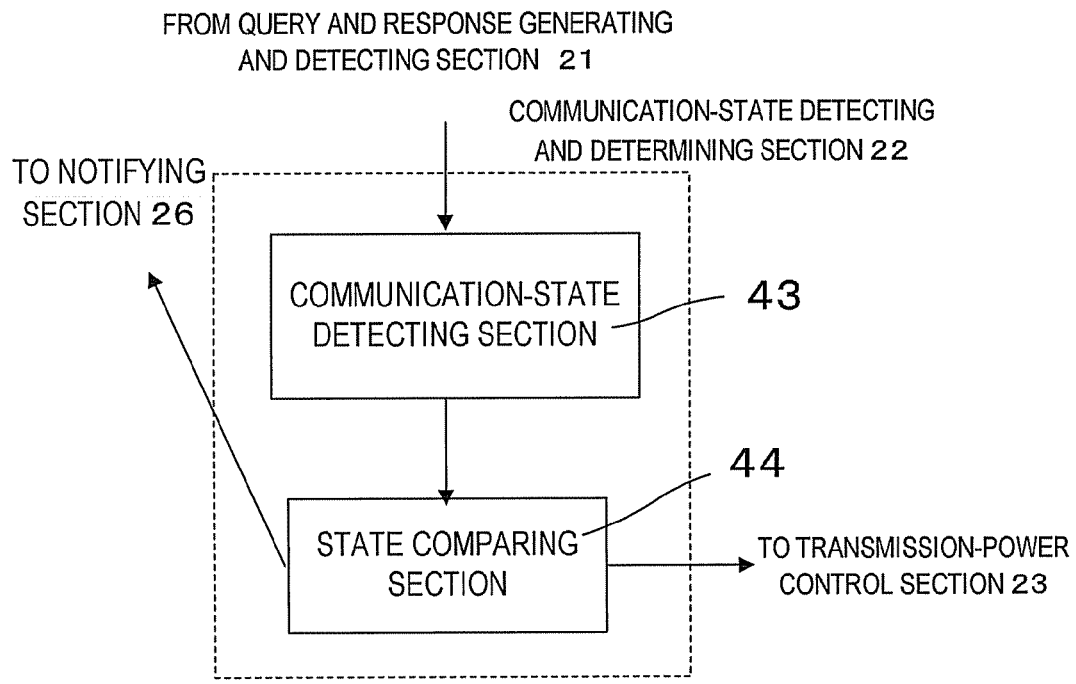
FIG. 4 is a diagram of a configuration example of a communication-state detecting and determining section in FIG. 3.

A configuration example of the communication-state detecting and determining section 22 is shown in FIG. 4. The communication-state detecting and determining section 22 includes a communication-state detecting section 43 that receives a signal level from the reception-signal-level detecting section 40 of the query-response generating and detecting section 21 and detects a communication state and a state comparing section 44 that compares an output of the communication-state detecting section 43 and a communication state set in advance. According to a result of the comparison, if it is necessary to change transmission power, the communication-state detecting and determining section 22 sends a transmission power control signal to the transmission-power control section 23 and the notifying section 26. The communication-state detecting section 43 actually detects a detected communication state value D in the wireless tag communication device.

The communication state corresponds to the number of times information was able to be correctly acquired from a tag within a predetermined time (the number of times of reading), a reading ratio, or a reception power level. The communication state means, for example, a reception power level at which a signal transmitted from a wireless tag communication device is received by a designated wireless tag. The communication state is represented by D as a detected communication state value.

Figure 5:
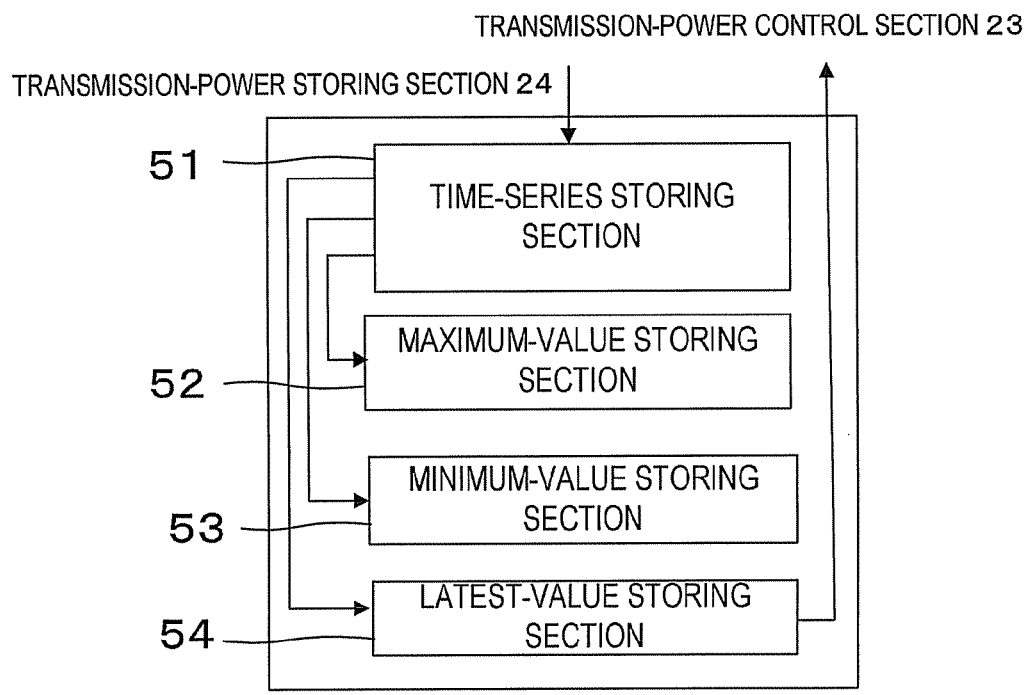
FIG. 5 is a diagram of a configuration example of a transmission-power storing section in FIG. 2.

A configuration example of the transmission-power storing section 24 is shown in FIG. 5. The transmission-power storing section 24 includes a time-series storing section 51 that sequentially stores transmission power during a satisfactory communication state in time series in each predetermined time, a maximum-value storing section 52 in which a maximum power value during satisfactory communication in the transmission power stored in the time-series storing section 51 is stored, a minimum-value storing section 53 in which a minimum power value during satisfactory communication is stored, and a latest-value storing section 54 in which a newest detected transmission power value D during satisfactory communication is stored.

Concerning this embodiment, (a) operation during wireless tag search, (b) determination of a transmission power initial value P1 at the start of the search, and (c) determination of a minimum value Pmin at the end of the search are sequentially explained with reference to a flowchart.

(a) Operation During Wireless Tag Search

Figure 6:
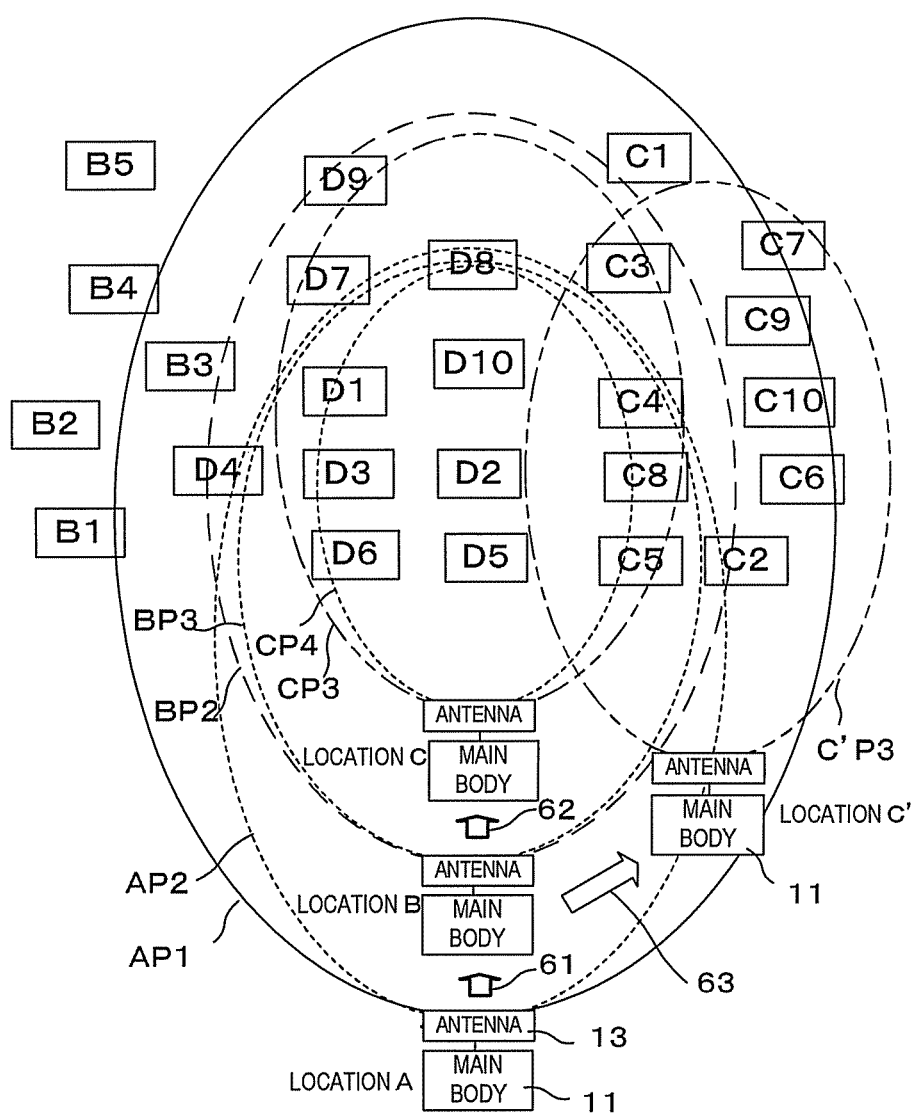
FIG. 6 is a diagram for explaining a change in a communicable range that changes when the wireless tag communication device moves.

It is assumed that the wireless tag communication device according to this embodiment performs communication with a wireless tag D8 in an area where wireless tags 31 to 35, C1 to C10, and D1 to D10 are mixedly present as shown in FIG. 6. The wireless tag communication device including the main body 11 and the antenna 13 is a movable mobile-type. The user moves from a location A to a location B and then moves to a location C.

An area where the user is present in the location A and can perform wireless communication with wireless tags at the transmission power P1 is represented by communicable area AP1. Similarly, communicable areas where the user can communicate with wireless tags are represented by combinations of locations A, B, C, and C' and transmission powers P1, P2, and P3.

Figure 7:
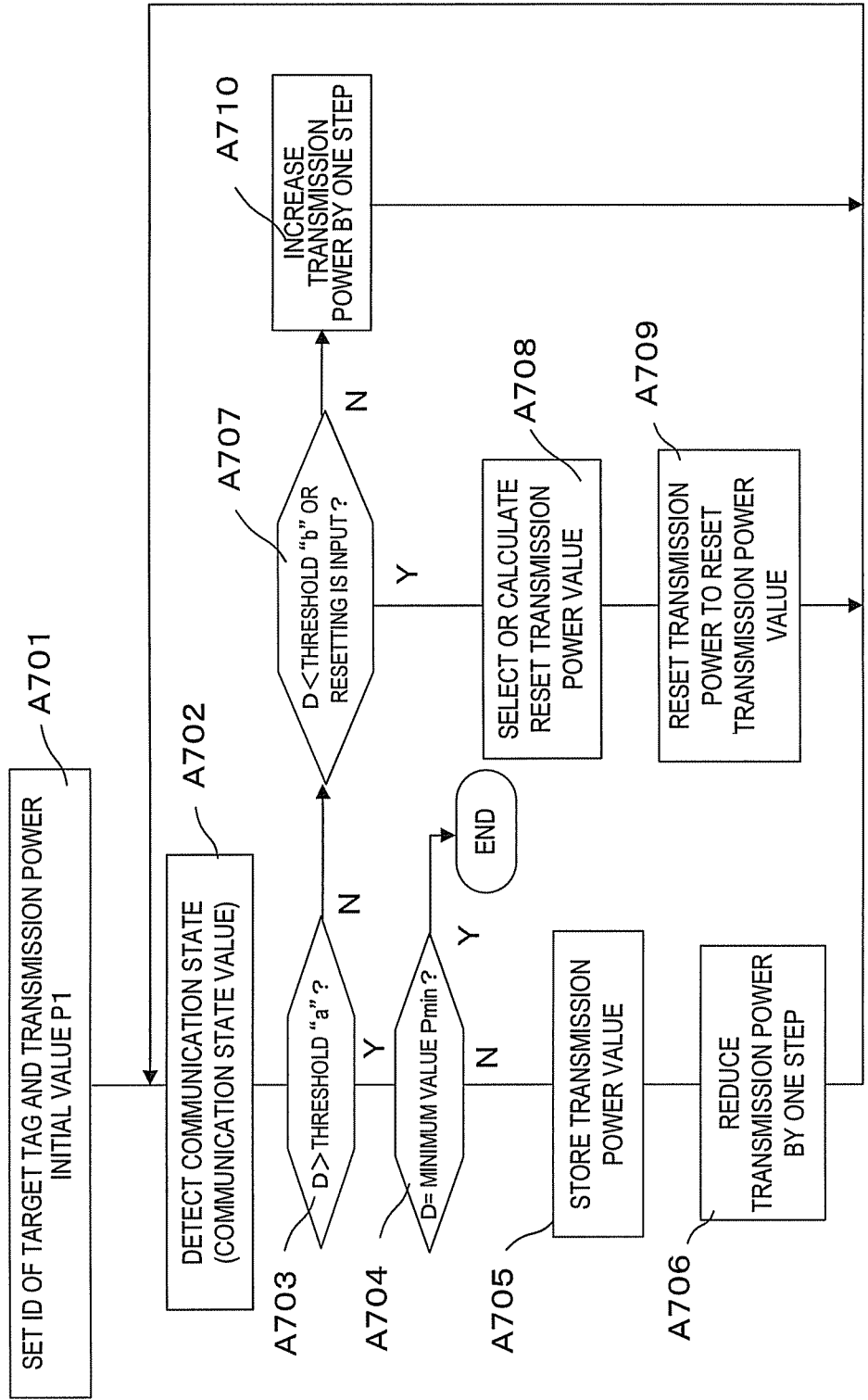
FIG. 7 is a flowchart for explaining an operation for performing a search for a wireless tag in the embodiment.

A flowchart during a search for the wireless tag D8 by the wireless tag communication device is shown in FIG. 7. First, the wireless tag D8 is input by the user present in the location A using the input keys 14 of the input section 25 and designated by the wireless-tag designating section 25b.

The user starts a search for the wireless tag D8 and reading of information from the wireless tag D8 in the location A and at the transmission power P1. A communicable area in this case is the communicable area AP1 indicated by a solid line. The transmission power is increased to set an area where the search and the reading of information are started in a sufficiently large area.

In Act A701 in FIG. 7, the user sets an ID of a search target and the transmission power initial value P1. The wireless tag D8 is present in the communicable area AP1 in this case. The user can read information from the wireless tag D8 by slightly moving the main body 11 and the antenna 13.

In next Act A702, the wireless tag communication device detects a communication state at this point. The communication state is represented by the number of times information was able to be correctly acquired from a tag within a predetermined time (the number of times of reading), a reading ratio, a reception signal level detected by the reception-signal-level detecting section 40, or the like. Subsequently, in Act A703, the wireless tag communication device compares, in the state comparing section 44 of the communication-state detecting and determining section 22, the detected communication state value D and a first threshold (a first communication state value) "a" and determines whether the detected communication state value D is larger than the first threshold "a". The wireless tag communication device compares, in the state comparing section 44 of the communication-state detecting and determining section 22, a communication state (the detected communication state value D) and the threshold "a". If the communication state exceeds the threshold "a", the wireless tag communication device determines that the communication state is satisfactory.

If the detected communication state value D is larger than the threshold "a", in Act A704, the wireless tag communication device compares, in a not-shown comparing section, a transmission power value at this point and a minimum value Pmin and determines whether the transmission power value is smaller than the minimum value Pmin. If the transmission power value at this point is smaller than the minimum value Pmin, the wireless tag communication device ends the search. A method of calculating the minimum value Pmin is explained in detail below in explanation of (c) operation at the end of the search.

If the user faces the antenna 13 in the direction of an arrow 61 in the location A, as shown in FIG. 6, the search target wireless tag D8 is present in the communicable area AP1 and the communication state is satisfactory.

If the wireless tag communication device determines in the not-shown comparing section that the transmission power value at this point is larger than the minimum value Pmin, the wireless tag communication device shifts to Act A705. The wireless tag communication device stores the transmission power value at this point in the time-series storing section 51 (see FIG. 5) of the transmission-power storing section 24.

Detected transmission power values stored in the storing sections of the transmission-power storing section 24 are explained with reference to FIG. 8. Transmission power values P1$i$ obtained when the communication state is satisfactory, i.e., when the detected communication state value D is larger than the threshold "a" are sequentially stored in the time-series storing section 51.

A maximum power value P1max among the stored transmission power values is stored in the maximum-value storing section 51. A minimum power value P1min among the stored transmission power values is stored in the minimum-value storing section 53. A newest power value P1last in the satisfactory communication state is stored in the latest-value storing section 54. An initial maximum value is represented by P1.

In next Act A706, the wireless tag communication device sends a power control signal from the communication-state detecting and determining section 22 to the transmission-power control section 23 to reduce the transmission power by one step. The wireless tag communication device returns to Act A702.

On the other hand, if the wireless tag communication device determines in Act A703 that the detected communication state value D is not larger than the first threshold "a", the wireless tag communication device shifts to Act A707. The wireless tag communication device determines whether the detected transmission power value D is smaller than the second threshold (a second communication state value) "b" or resetting of transmission power is input.

The wireless tag communication device compares, in the state comparing section 44 of the communication-state detecting and determining section 22, the detected communication state value D and the second threshold "b" and determines whether the detected communication state value D is smaller than the second threshold "b". The user performs the resetting of the transmission power by performing predetermined operation from the input keys 14 or using the mouse 25$a$ of the input section 25 to input a resetting control signal to the transmission-power control section 23 through the resetting instructing section 25$c$.

If the wireless tag communication device determines in Act A707 that the detected communication state value D is smaller than the threshold "b", in Act A708, for example, the wireless tag communication device reads out a latest value in a satisfactory communication state from the latest-value storing section 54 of the transmission-power storing section 24. Alternatively, if an optimum transmission power value is not stored, the wireless tag communication device calculates the latest value from a stored value. Even if the resetting is requested from the input section 25, for example, the wireless tag communication device reads out the latest value from the latest-value storing section 54 of the transmission-power control section 23. The transmission-power control section 23 sets the transmission power to the value.

The detected transmission power value D is smaller than the threshold "b" in this way when, for example, in FIG. 6, the user moves to a location C' and becomes unable to communicate with the wireless tag D8 at all.

In next Act A709, the wireless tag communication device sets the transmission power reset value in the radio section from the transmission-power control section 23 and returns to Act A702 for detecting a communication state.

On the other hand, if the wireless tag communication device determines in the communication-state detecting and determining section 22 in Act A707 that the detected communication state value D is not smaller than the threshold "b", the wireless tag communication device sends a transmission power control signal of that effect to the transmission-power control section 23 to increase the transmission power by one step. Thereafter, the wireless tag communication device returns to Act A702 and detects a communication state.

As explained above, if a signal is transmitted at the transmission power initial value P1 and the communication state is satisfactory at first in the location A, the wireless tag communication device gradually reduces the transmission power. If the transmission power is reduced and the detected communication state value D is smaller than the threshold "a" and larger than the threshold "b", the wireless tag communication device increases the transmission power by one step. Therefore, when the first transmission power initial value P1 is transmitted in the location A, the communicable area is AP1. However, when the transmission power is gradually reduced, the communicable area changes to AP2 where the transmission power properly reaches the wireless tag D8 (the transmission power at this point is P2).

In FIG. 6, if the user moves to the location B following an arrow 61, the communicable area changes to BP1. The location B is closer to the wireless tag D8. Therefore, if a signal is transmitted at the transmission power P2, naturally, the wireless tag communication device covers a farther distance than the wireless tag D8. A communicable area BP2 indicated by a broken line in FIG. 6 represents this coverage. If the wireless tag communication device is caused to act from Act A702 in the flowchart of FIG. 7 in this state, as long as a communication state is satisfactory, the wireless tag communication device shifts to Acts A703 to A706 and returns to Act A702. Therefore, the transmission power is reduced. On the other hand, if the communication state is smaller than the first threshold "a", the wireless tag communication device increases the transmission power by one step (A702, A703, A707 to A709, and A702). Therefore, the transmission power changes to P3 and the communicable area changes to BP3 where a radio wave barely reaches the wireless tag B8 from the location B.

Further, the user moves to the location C following an arrow 62 and continues the search for the wireless tag D8 from this location at the transmission power P3. A communicable area at this point is CP3 indicated by an alternate long and short dash line in FIG. 6. In the location C, as in the location A, the wireless tag communication device reduces the transmission power by one step at a time. The transmission power changes to transmission power P4 at which a transmission radio wave barely reaches the wireless tag D8. A communicable area at this point is CP4. When the user approaches the wireless tag D8 carrying the wireless tag communication device including the main body 11 and the antenna 13, it is possible to reduce the transmission power in a range in which the user can communicate with the wireless tag D8.

A determination result or the like in the state comparing section 44 of the communication-state detecting and determining section 22 is sent to the notifying section 26 and displayed on a display screen of the display section 15 or warned with, for example, a buzzer by sound in the sound warning section 26a.

As explained above, the communication state with the wireless tag is warned with a buzzer or displayed on the display section 15. Therefore, the user can detect the direction of the search target wireless tag. In a state in which the user stays in the location A, the transmission power decreases according to the flow explained above. Therefore, if the transmission power changes to P2, the communication state is equal to or smaller than the threshold "a". However, if the user moves in the direction in which the wireless tag is detected, the user can reach the search target wireless tag D8 through the locations B and C shown in FIG. 6 while keeping the satisfactory communication state. If the transmission power decreases and the detected transmission power value decreases to the minimum value Pmin, the search ends.

If the transmission-power control section reduces the transmission power quicker than the user moving in the direction in which the wireless tag is detected, the communication state does not exceeds the threshold "a". If the communication state is equal to or smaller than the first threshold "a" and equal to or larger than the second threshold "b", the transmission-power control section increase the transmission power by one step (see A710 in FIG. 7). If the user stays in the location A, the transmission power repeatedly changes to P2 and the transmission power higher than P2 by one step. The threshold "b" is a second threshold (a second communication state value) for determining, if the communication state falls below the threshold "b", that a target wireless tag D deviates from a communicable range.

The user sometimes moves in a direction (e.g., an arrow 63) different from the direction of the search target wireless tag D8. If the user moves to the location C' as shown in FIG. 6, the communication state falls below the second threshold "b". If the communication state falls below the threshold "b", the communication-state detecting and determining section 22 determines that the wireless tag communication device loses track of the search target wireless tag D8. The transmission-power control section 23 selects the transmission power value stored in the transmission-power storing section 24 or resets the transmission power with a value of appropriate transmission power calculated from the stored transmission power value.

Concerning the selection of the transmission power to be reset, if a latest value is selected, the communication state can be set in a state of a nearest satisfactory communication state. Therefore, in the explanation of this embodiment, the transmission-power storing section 24 shown in FIG. 5 selects the latest value stored in the latest-value storing section 54 and resets the transmission power. However, a transmission power value, which is not the latest value, can also be set as the value stored in the transmission-power storing section 24.

Although not shown in FIG. 2, the transmission-power control section 23 notifies the notifying section 26 that the transmission power is reset. The user learns, on the display screen of the display section 15 of the notifying section 26, that the user returns to the location B where the communication state is satisfactory.

If the wireless tag communication device loses track of the wireless tag D8 (Y in Act A707), the wireless tag communication device may perform display on the display screen to urge the user to move to a location where the communication state is satisfactory. The wireless tag communication device may cause the display section 15 of the notifying section 26 to display whether the transmission power reset value is set to the latest value or a value other than the latest value. In this way, the wireless tag communication device may enable the user to determine to which location the user should move.

Alternatively, instead of resetting the transmission power when the detected transmission power value D, which is the communication state, falls below the threshold "b", the user inputs resetting of the transmission power through the input section 25, whereby, in the same manner as explained above, the transmission-power control section 23 may select the transmission power stored in the transmission-power storing section 24 or select transmission power from a transmission power range, reset the transmission power, and notify the notifying section 26 that the transmission power is reset.

In this way, even if the wireless tag communication device loses track of a search target wireless tag, the user can return to the satisfactory communication state and restart the search and can return to the initial state and efficiently resume the search without setting the transmission power to the first large value.

Further, the function of increasing the transmission power if the communication state (the detected communication state value D) is equal to or smaller than the first threshold "a" and equal to or larger than the second threshold "b" is provided. Therefore, it is possible to prevent the wireless tag communication device from losing track of a search target wireless tag.

In the explanation of the operation shown in FIG. 7, the transmission power is immediately reset if the communication state falls below the threshold "b". However, the transmission power may be reset if the communication state smaller than the threshold "b" continues for a predetermined time or more.

Alternatively, the transmission power may be reset if the communication state smaller than the threshold "b" is detected a plurality of times. The same applies when the communication state exceeds the threshold "a" and the transmission power is reduced and when the communication state is equal to or smaller than the threshold "a" and equal to or larger than the threshold "b" and the transmission power is increased.

(b) Determination of the Transmission Power Initial Value P1 at the Start of the Search It is explained with reference to FIG. 9 how the wireless tag communication device according to this embodiment determines a value of the initial value P1 of the transmission power at the start of the search.

As it is likely when a wireless tag is actually attached to an article to be searched and the search is started in an environment in which the user actually uses the wireless tag communication device, the function is used in a location of a longest distance from the article (attached with the wireless tag). Consequently, it is possible to easily detect and set an initial value of the transmission power at the start of the search with which the search can be efficiently performed. In the determination of the initial value of the transmission power in this case, the configurations shown in FIGS. 2, 4, and 5 can be used.

Although not shown in the figures, when the user selects the function by, for example, inputting the selection to the input section 25, in Act A901, the wireless tag communication device sets, in the transmission-power control section 23, a maximum value in a possible range as transmission power and starts communication (reading) with a target wireless tag in the same manner as explained above. In this case, as in the above explanation, a communication state is represented by a detected value of the communication state (the detected communication state value D). In FIG. 9, the detected communication state value D is compared with two thresholds "c" and "d". The threshold "c" is a value for determining whether the communication state is extremely satisfactory. The threshold "d" is a value for determining whether the communication state is allowable. Naturally, the threshold "d" is smaller than the threshold "c".

In Act A902, the wireless tag communication device detects a communication state value representing a communication state. In next Act A903, the wireless tag communication device compares the detected communication state value D and the threshold "c" and determines whether the detected communication state value D is larger than the threshold "c". The wireless tag communication device performs this comparison and determination in the communication-state detecting and determining section 22.

If the wireless tag communication device detects transmission power in the communication-state detecting and determining section 22 and the detected communication state value D exceeds the threshold "c", the wireless tag communication device shifts to Act A904 and stores a transmission power value at this point in the transmission-power storing section 24.

At this point, in Act A905, the wireless tag communication device detects whether the transmission power value is the minimum value Pmin. If the transmission power value is not the minimum value Pmin, in Act A906, the wireless tag communication device reduces the transmission power by one step.

Specifically, the communication-sate detecting and determining section 22 determines that the transmission power is too large. The transmission-power control section 23 stores the transmission power value at this point in the transmission-power storing section 24 and reduces the transmission power by one step. If the transmission power is a settable minimum value (Y in Act A905), since the transmission power may be unable to be further reduced, the transmission power is set as a transmission power initial value at the start of the search.

If the communication state does not exceed the threshold "c" (N in Act A903), the wireless tag communication device detects, in the state comparing section 44 of the communication-state detecting and determining section 22, whether the detected transmission power value D exceeds the threshold "d".

If the communication state is equal to or smaller than the threshold "c" and larger than the threshold "d" (Y in Act A907), in Act A908, the wireless tag communication device stores, in the transmission-power control section 23, the detected transmission power value at this point in the transmission-power storing section 24. If the transmission power value is larger than the settable minimum value Pmin, it is determined N in Act A905. In Act A906, the wireless tag communication device reduces the transmission power by one step.

In this way, if the detected transmission power value D is sufficiently larger than the threshold "c", the wireless tag communication device repeats the loop of Acts A902 to A906, stores transmission power values, and reduces transmission power by one step at a time. If the detected transmission power value D is smaller than the threshold "c" and larger than the threshold "d", the wireless tag communication device reduces the transmission power while storing the transmission power value.

If the detected communication state value D is smaller than the threshold "d" (N in Act A907), the wireless tag communication device determines, in the communication-state detecting and determining section 22, that the communication state is too bad. In Act A909, the wireless tag communication device selects or calculates, in the transmission-power control section 23, an appropriate transmission power value from the transmission power values stored in the transmission-power storing section 24. In Act A910, the wireless tag communication device sets the transmission power value as the transmission power initial value P1 at the start of the search.

If the transmission power initial value P1 is set in an environment in which the wireless tag communication device is actually used, it is unnecessary to perform the search with transmission power larger than the transmission power initial value P1 at the start of the search.

The selection or the calculation of the transmission power initial value P1 is explained.

FIGS. 10A, 10B, 10C, and 10D are examples of transmission power values stored in the transmission-power storing section 24 in the case of the function of detecting and setting transmission power at the start of the search in this embodiment. As shown in FIGS. 10A and 10B, there are a region of transmission power exceeding the threshold "c" and a region of transmission power equal to or smaller than the threshold "c" and equal to or larger than the threshold "d". The regions are respectively stored in time series.

As shown in FIGS. 10C and 10D, a maximum value and a minimum value of the transmission power equal to or smaller than the threshold "c" and equal to or larger than the threshold "d" are detected and stored. If the transmission power falls below the threshold "d", an average of Psmax and Psmin is calculated. Transmission power closest to the average value is detected and set as a transmission power initial value at the start of the search. Alternatively, the user may set and select the transmission power initial value from the input section. If the transmission power equal to or smaller than the threshold c and equal to or larger than the threshold d is absent, the user selects a minimum value in the transmission power exceeding the threshold "c". Alternatively, the user may set and select the minimum value from the input section. Further, if transmission power exceeding the threshold "c" is also absent, the user selects a maximum value of transmission power smaller than the threshold "d". However, in this case, the transmission power maximum value is the maximum value P1 of the settable transmission power.

Consequently, the user can easily set an optimum transmission power initial value at the start of the search at a longest distance for searching for an article in an actual environment of use. Convenience of use for the user is improved. It is possible to efficiently perform the search in a short time by optimizing the transmission power initial value at the start of the search.

There are various search scenes such as a search in an entire large warehouse area and a search limited to a specific shelf. Distances for the search are also various. For example, if transmission power is too large with respect to a distance between the user and an article to be searched, time for reducing the transmission power is necessary. Therefore, the search takes time. Further, detection of a direction is difficult. If transmission power is small with respect to a distance between the user and an article to be searched, a wireless tag attached to the article to be searched may be unable to be read. Therefore, the search takes time. If the function is used, it is possible to efficiently perform the search in a short time and easily perform detection and setting of transmission power at the start of the search.

(c) Determination of the Minimum Value Pmin at the End of the Search

A method of determining the transmission power value Pmin for ending the search in Act A704 in FIG. 7 and Act A905 in FIG. 9 is explained with reference to a flowchart of FIG. 11. Actions of the flowchart are performed by the configurations shown in FIGS. 2 to 5 in the same manner as explained above. A threshold "f" is smaller than a threshold "e".

Figure 11:
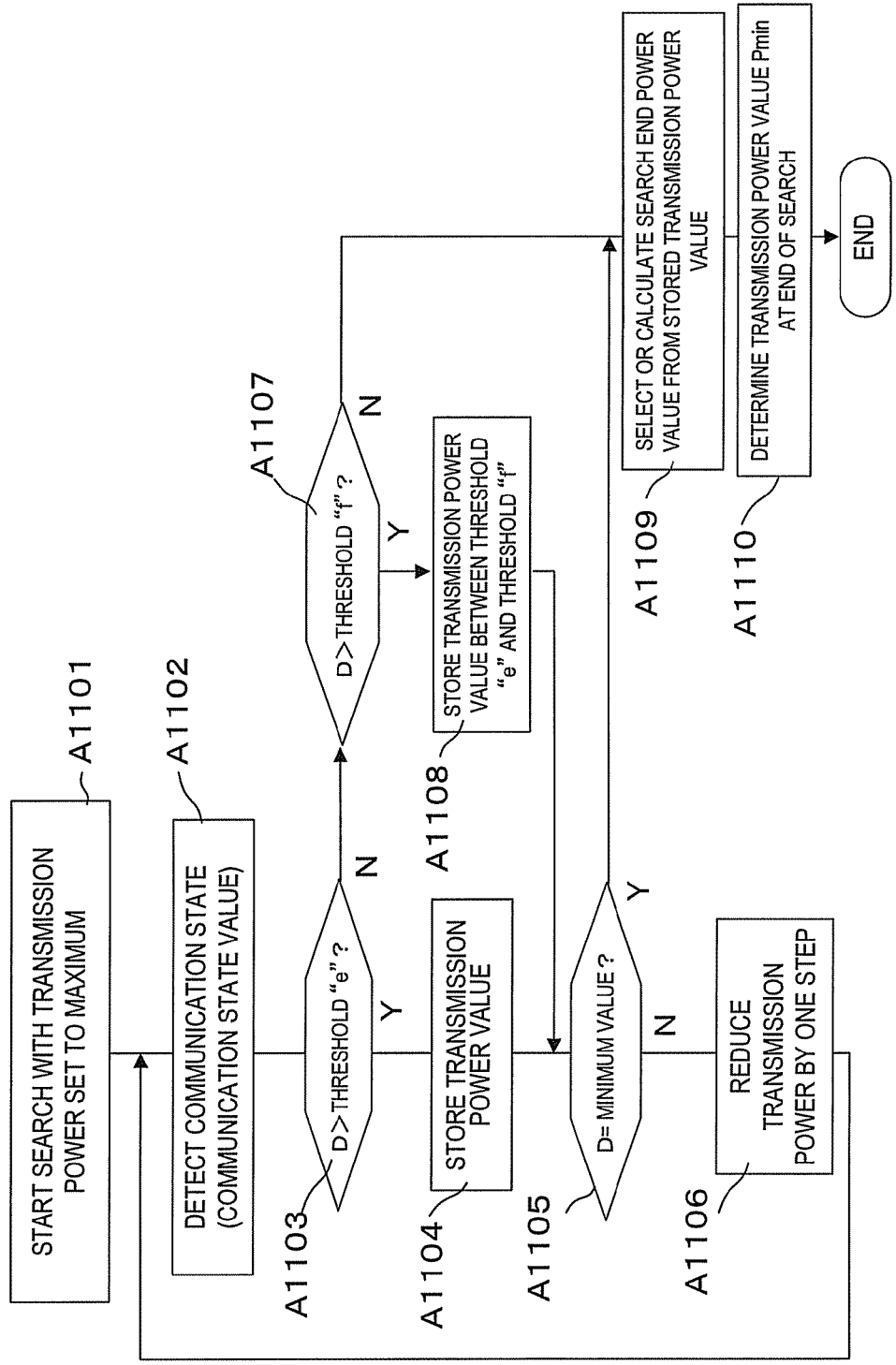
FIG. 11 is a flowchart for explaining an operation for determining a minimum value at the end of the search in FIG. 7.

In FIG. 11, in Act A1101, the wireless tag communication device starts a search for a wireless tag with transmission power set to a maximum. In Act A1102, the wireless tag communication device detects a communication state (a communication state value). In Act A1103, the wireless tag communication device compares the detected communication state D with the threshold "e". The wireless tag communication device performs the comparison in the state comparing section 44 of the communication-state detecting and determining section 22.

If the detected communication state value D is larger than the threshold "e", in Act A1104, the wireless tag communication device stores a transmission power value at this point in the transmission-power storing section 24. In next Act A1105, the wireless tag communication device determines whether the transmission power value is a minimum value. If the transmission power value is not the minimum value, in Act A1106, the wireless tag communication device reduces transmission power by one step and returns to Act A1102.

On the other hand, if the detected communication state value D is equal to or smaller than the threshold "e" in Act A1103, the wireless tag communication device shifts to Act A1107 and compares the detected communication state value D with the threshold "f". The wireless tag communication device performs the comparison in the state comparing section 44 of the communication-state detecting and determining section 22.

If the detected communication state D is larger than the threshold "f", in Act A1108, the wireless tag communication device stores a transmission power value at this point and shifts to Act A1105. In this case, as explained above, since the transmission power value is not the minimum value, in Act A1106, the wireless tag communication device reduces the transmission power by one step.

On the other hand, if the detected communication state D is equal to or smaller than the threshold "f" in Act A1107, the wireless tag communication device shifts to Act A1109 and selects or calculates a search end power value from the transmission power values stored in the transmission-power storing section 24. In next Act A1110, the wireless tag communication device sets the selected or calculated transmission power value as the transmission power value Pmin at the end of the search. A computer program for determining a transmission power value ends at the end of the search. In Act A704 in FIG. 7, the wireless tag communication device uses, as the minimum value, the transmission power minimum value Pmin determined in this way.

When the user actually attaches a wireless tag to an article to be searched and starts and ends the search in an environment in which the user actually uses the wireless tag communication device, in a location in a reading range desired to be narrowed down with respect to the article, it is possible to easily detect and set, by using the function, a transmission output at the end of the search for efficiently performing and ending the search.

Consequently, the user can easily set an optimum transmission output at the end of the search corresponding to a reading range at the end of the search in an actual environment of use. Convenience of use for the user is improved. It is possible to efficiently perform the search in a short time by optimizing the transmission output at the end of the search. Spaces among articles are various depending on search scenes. If the transmission output at the end of the search is too large, the search ends with a search target being unable to be narrowed down. Conversely, if the transmission output at the end of the search is too small, the user needs to approach a search target wireless tag more than necessary. Depending on the external shape or the shape of an article or a wireless tag attaching position, the user may be unable to approach the wireless tag. This is inconvenient for the user. If an optimum transmission output at the end of the search can be easily detected and set by the function, it is possible to efficiently perform the search in a short time.

In the explanation referring to FIG. 3 of the configuration of this embodiment, the circulator is used. However, in general, any directional coupler may be used without being limited to the circulator.

Another Embodiment

In the embodiment explained above, the function of transmitting a radio wave to a wireless tag and receiving a radio wave from the wireless tag and the function of controlling transmission power from the received radio wave are integrally provided in the wireless tag communication device. However, it is also possible to divide a section for transmitting and receiving radio waves to and from a wireless tag and a section for determining how electric power should be controlled from the received radio wave and controlling the electric power.

Figure 12:
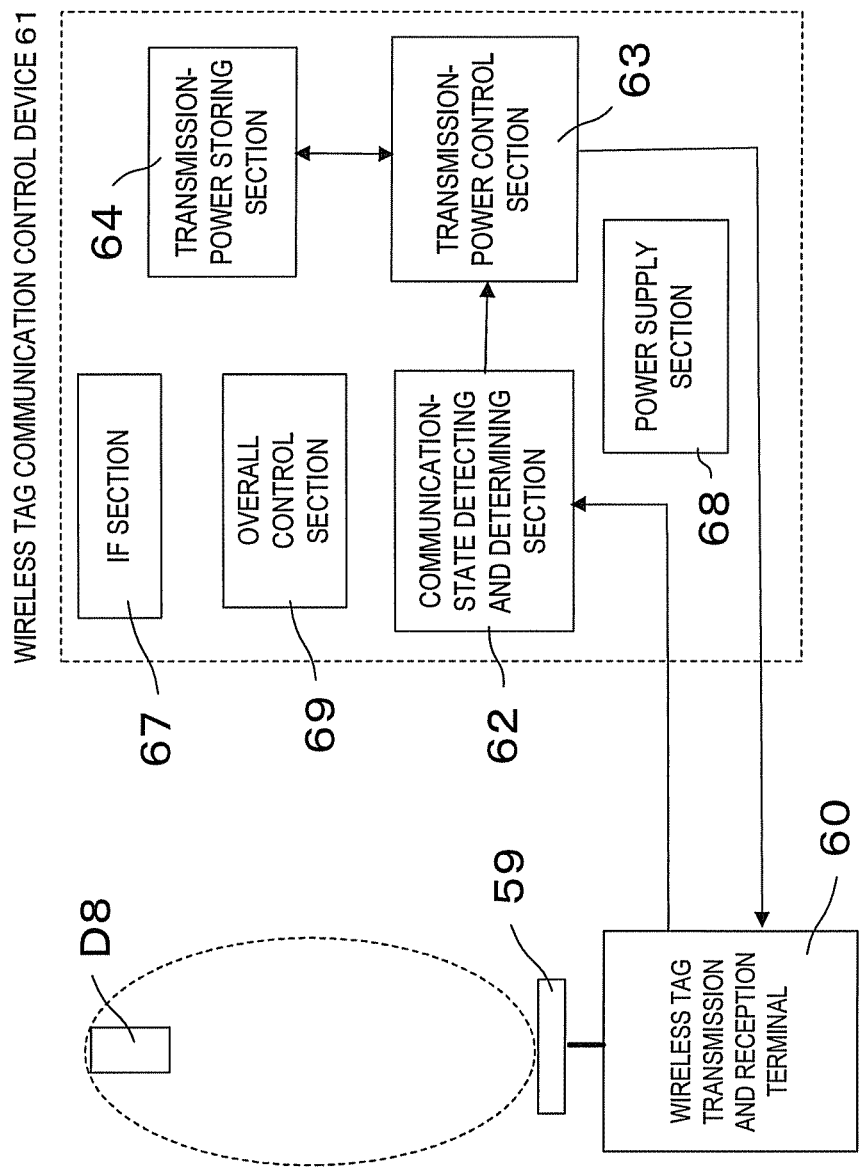
FIG. 12 is a diagram of a configuration example of a wireless tag communication device according to another embodiment.

Such another embodiment is explained with reference to the drawings. In this embodiment, as shown in FIG. 12, the wireless tag communication device includes a wireless tag transmission and reception terminal 60 connected to an antenna 59 for performing transmission and reception with a wireless tag and a wireless tag communication control device 61 that determines a communication state with the wireless tag from a radio wave received by the wireless tag transmission and reception terminal 60 and sends a transmission power control signal for controlling transmission power.

The antenna 59 for transmitting a radio wave to a wireless tag, for example, the wireless tag D8 and receiving a radio wave from the wireless tag D8 is connected to the wireless tag transmission and reception terminal 60.

The wireless tag communication control device 61 includes a communication-state detecting and determining section 62 that detects and determines a communication state between the antenna 59 and the wireless tag D8, a transmission-power control section 63 that sends a transmission power control signal for controlling transmission power of transmission from the antenna 59 on the basis of a result of the determination, a transmission-power storing section 64 that stores the transmission power controlled by the transmission-power control section 63, an interface (IF) section 67 that performs communication with a host computer or the like, a power supply section 68 that supplies electric power to the sections, and an overall control section 69 that controls the sections as a whole.

Figure 13:
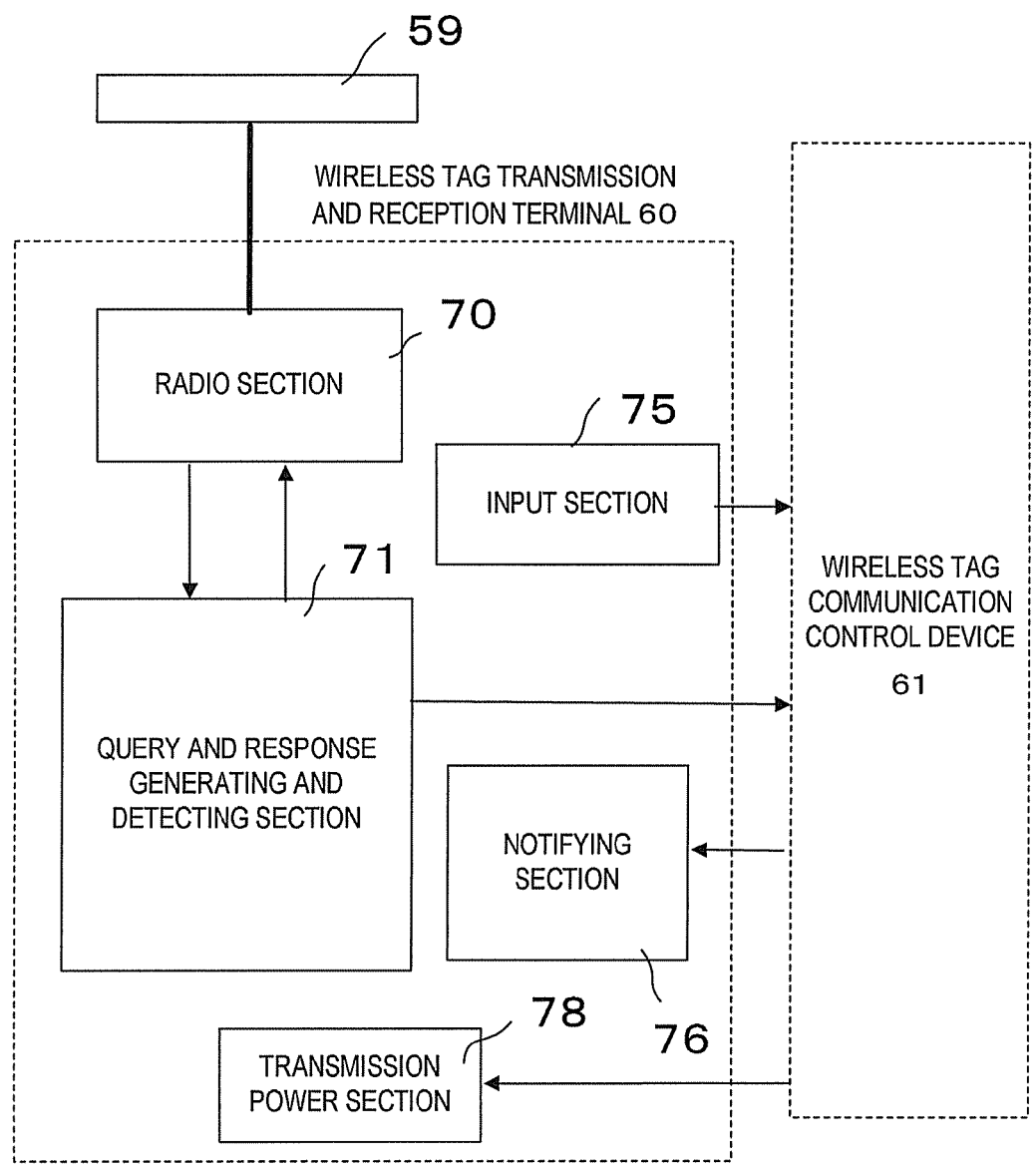
FIG. 13 is a diagram of a configuration example of a wireless tag transmission and reception terminal in the other embodiment shown in FIG. 12.

A configuration example of the wireless tag transmission and reception terminal 60 is shown in FIG. 13. The wireless tag transmission and reception terminal 60 includes a radio section 70 that performs communication with a wireless tag via the antenna 59, a query and response generating and detecting section 71 that generates a query signal to be transmitted from the antenna 59, detects and decodes content of a response signal received from the wireless tag, and sends the content to the communication-state detecting and determining section 62 of the wireless tag communication control device 61, an input section 75 that receives input of resetting from the outside, for example, if a wireless tag to communicate with may be unable to be specified or communication with a specified wireless tag may be unable to be performed, a notifying section 76 that notifies a user of a communication state and the like of the device, and a transmission power section 78 that receives a transmission power control signal from the transmission-power control section 23 of the wireless tag communication control device 61 and increases or decreases electric power transmitted to the wireless tag.

The operation of this embodiment is explained with reference to FIGS. 12 and 13. First, the wireless tag communication device transmits, at initial power, a radio wave of a transmission signal from the antenna 59 connected to the wireless tag transmission and reception terminal 60 to a target wireless tag, for example, the wireless tag D8. This query signal is a signal generated by the query and response generating and detecting section 71 and sent from the radio section 70 to the antenna 59. A radio wave of a response signal from the wireless tag D8 is received by the antenna 59 and input to the query and response generating and detecting section 71 via the radio section 70 of the wireless tag transmission and reception terminal 60. The intensity of a radio wave of the response signal and the like are sent to the communication-state detecting and determining section 62 of the wireless tag communication control device 61.

Determination processing of the communication-state detecting and determining section 62 is the same as the processing explained above with reference to FIGS. 2 to 5 in the embodiment. The transmission-power storing section 64 operates in the same manner as the transmission-power storing section 24 explained above with reference to FIG. 5 in the embodiment.

A result of the determination by the communication-state detecting section 62 is sent to the transmission-power control section 63. A control signal for controlling whether transmission power from the wireless tag transmission and reception terminal 60 should be increased or decreased is generated. The transmission power control signal is sent from the transmission-power control section 63 to the transmission power section 78 of the wireless tag transmission and reception terminal 60 and the transmission power is increased or reduced.

Communication between the wireless tag transmission and reception terminal 60 and the wireless tag communication control device 61 in this embodiment may be performed by wire or may be performed by radio.

In this way, according to this embodiment, the wireless tag communication device is obtained that can easily, quickly, and efficiently make recovery even if losing track of a search target wireless tag. Moreover, in this embodiment, when the user approaches the wireless tag, the user can move carrying only the wireless tag transmission and reception terminal.

The configurations of the wireless tag transmission and reception terminal 60 and the wireless tag communication control device 61 in the embodiment shown in FIGS. 12 and 13 can be freely changed. For example, it is also possible to perform communication state detection and determination in the wireless tag transmission and reception terminal, send a state signal of the communication state detection and determination to the wireless tag communication control device, calculate a control amount of transmission power or the like, and send a result of the calculation to the wireless tag transmission and reception terminal. Further, it is also possible to send information concerning a communication state to a host server or the like via the IF section of the wireless tag communication control device, determine a communication state in the host server, determine a control amount of transmission power, and return the control amount to the wireless tag transmission and reception terminal.

In short, the respective kinds of processing of the transmission and reception to and from a wireless tag, the detection of a communication state from a result of the transmission and reception, and the control of transmission power based on the communication state may be performed in structure of not only one layer but also two or three or more layers. In such a form, a terminal other than a terminal that transmits a signal to the wireless tag and receives a response signal from the wireless tag is generally referred to as information processing apparatus herein.

The transmission power section 78 and the transmission-power control section 63 in the embodiment shown in FIGS. 12 and 13 correspond to the transmission-power control section 23 shown in FIG. 2 in the embodiment explained above.

The wireless tag communication control device in this embodiment may be a server provided via a network or the like or may be a general-purpose device such as a smart phone.

In the explanation of the embodiment, the dedicated devices are used. However, it is also possible to apply the present invention using a computer program, i.e., use the present invention in a form of installing this transmission power control program in a storage medium of a general-purpose device.

As explained above in detail, according to the embodiment, the wireless tag communication device is obtained that can easily, quickly, and efficiently make recovery even if losing track of a search target wireless tag.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as fall within the scope and spirit of the inventions.

What is claimed is:

1. An information processing apparatus comprising:
a communication-state determining section configured to detect a communication state value in transmission of a signal to a specific wireless tag to be searched and in communication with the wireless tag;
a transmission-power control section configured to perform control to reduce transmission power of a signal to be transmitted from a radio section if a detected communication state value detected by the communication-state determining section is larger than a first threshold and increase the transmission power of the signal to be transmitted from the radio section if the detected communication state value is smaller than the first threshold;
a transmission-power storing section configured to store, if the communication state value is larger than the first threshold, a transmission power value at the communication state value; and
a transmission-power resetting section configured to perform, if the communication state value decreases to be smaller than a second threshold smaller than the first threshold, resetting of the transmission power on the basis of the stored power value stored in the transmission-power storing section and transmit the reset transmission power value from the radio section.

2. The apparatus according to claim 1, wherein a transmission power initial value for starting the search for the wireless tag is set in advance on the basis of the transmission power value stored in the transmission-power storing section in an environment in which the device performs communication with the wireless tag.

3. The apparatus according to claim 2, wherein a transmission power minimum value for ending the search for the wireless tag is set in advance on the basis of the transmission power value stored in the transmission-power storing section.

4. The device according to claim 1, further comprising a notifying section configured to notify, if the resetting is performed, that the resetting is performed.

5. The device according to claim 1, wherein a transmission power minimum value ending the search for the wireless tag is set in advance on the basis of transmission power value stored in the transmission-power storing section.

6. The device according to claim 5, further comprising a notifying section configured to notify, if the resetting is performed, that the resetting is performed.

7. A method of information processing, comprising:
detecting a communication state value in transmission of a signal to a specific wireless tag to be searched and in communication with the wireless tag;
controlling to reduce transmission power of a signal to be transmitted from a radio section if a detected communication state value is larger than a first threshold and to increase the transmission power of the signal to be transmitted from the radio section if the detected communication state value is smaller than the first threshold;
storing a transmission power value at the communication state value if the communication state value is larger than the first threshold;
resetting the transmission power on the basis of the stored power value stored in the transmission-power storing section if the communication state value decreases to be smaller than a second threshold smaller than the first threshold; and
transmitting the reset transmission power value from the radio section.

8. The method according to claim 7 wherein
a transmission power initial value for starting the search for the wireless tag is set in advance on the basis of the stored transmission power value in an environment in which the device performs communication with the wireless tag.

9. The method according to claim 8, wherein a transmission power minimum value for ending the search for the wireless tag is set in advance on the basis of the stored transmission power value.

10. The method according to claim 7, further comprising notifying that the resetting is performed if the resetting is performed.

* * * * *